UNITED STATES PATENT OFFICE.

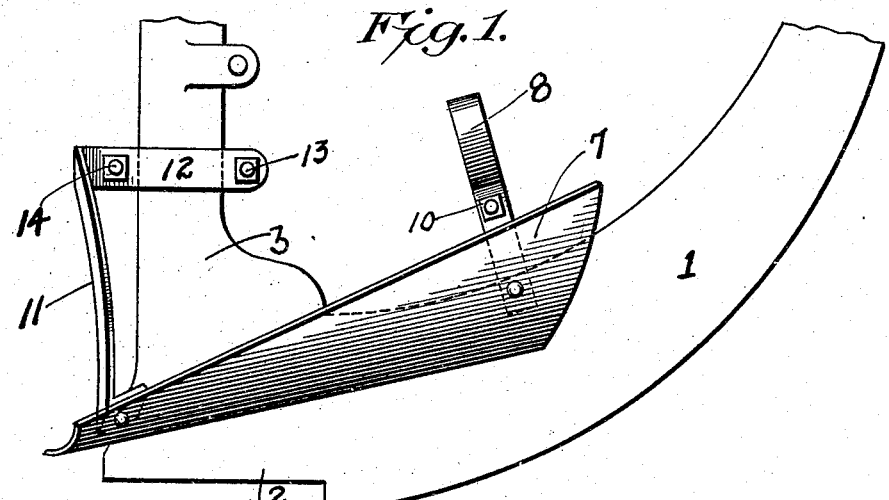
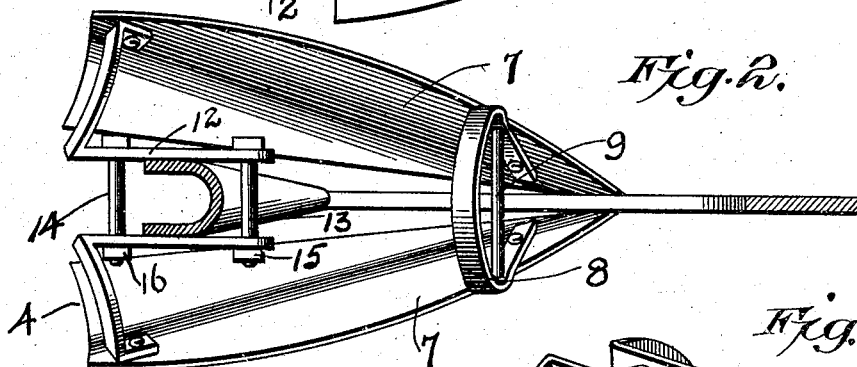
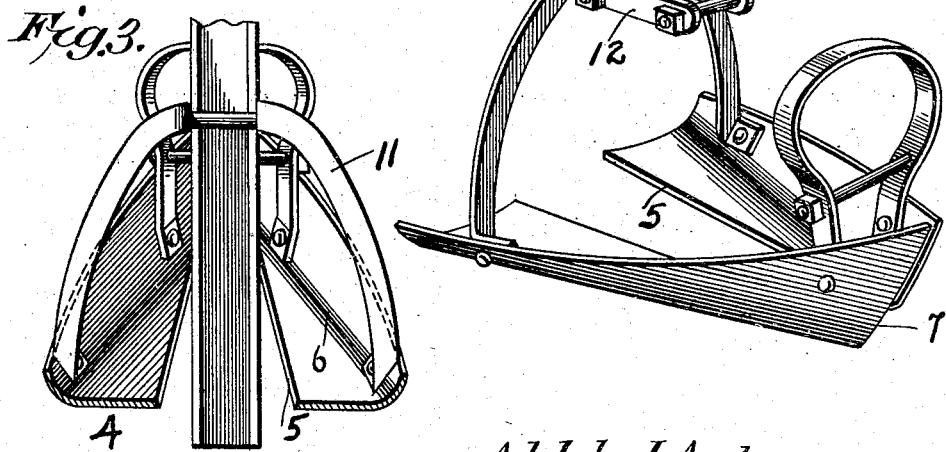

ADOLPH J. ANDERSON, OF HOUSTON, MINNESOTA.

CORN-PLANTER.

941,485.

Specification of Letters Patent. Patented Nov. 30, 1909.

Application filed June 14, 1909. Serial No. 502,011.

*To all whom it may concern:*

Be it known that I, ADOLPH J. ANDERSON, a citizen of the United States, residing at Houston, county of Houston, and State of Minnesota, have invented certain new and useful Improvements in Corn-Planters, of which the following is a specification.

This invention relates to corn planters and has specially in view an attachment for the furrow opener thereof which will smooth the furrow and also regulate the depth of the furrow so as to insure of a proper and uniform furrow being made.

With the above and many other objects in view the invention contemplates the employment of a shoe that has a rigid but detachable connection with the planter or one of its standards and a yielding connection with the furrow opener, the arrangement being such that the shoe automatically adjusts itself on said furrow opener to compensate for any irregularities in the furrow.

In carrying out the objects of the invention generally stated above it will of course, be understood that the essential features of the invention are susceptible of structural changes thereof as shown in the accompanying drawings, wherein, Figure 1, is a side elevation of a furrow opener showing the improved shoe attached thereto. Fig. 2, is a horizontal sectional view of the same, taken on the line 2—2, Fig. 1. Fig. 3, is a rear elevation. Fig. 4, is a perspective view of the shoe detached from the planter.

Like characters of reference designate corresponding parts.

The invention embodies in its general organization a furrow opener 1, which may be of the usual, or any preferred type, the front end of which is upturned and provided with the usual plates which are bolted to the frame of the planter. The rear cutting face of the furrow opener terminates in a cut portion 2 which may be in a horizontal plane slightly higher than the plane of the cutting face proper of the furrow opener, and from which extends the standard 3 which may be provided with the usual plate for attachment to the planter frame. In the preferred embodiment of the invention shown in the accompanying drawings, the standard 3 and the furrow opener 1 are integral and preferably the standard is of a U-shape in cross section.

The improved shoe forming the principal feature of this invention consists of two complemental members having a substantially flat bottom 4 the inner edge of which is straight as indicated at 5, and the outer edge of which inclines forwardly as indicated at 6, and forms a flat bottom which presents its straight edge 5, to the furrow opener. Its opposite edge is rounded and terminates in the upstanding side wing 7, which tapers rearwardly as is shown more clearly in Figs. 1 and 4. The said two members are located on opposite sides of the furrow opener and have their forward ends connected and held in yielding engagement with said opener by means of an upstanding, loop shaped strap 8 the ends of which are securely riveted or otherwise suitably fastened to the side wings 7. The said strap 8, loops over the opener and has a bolt 9 passed through it which carries a nut 10, through the medium of which the engagement between the said shoe and the said opener may be controlled.

The rear end of each of the complemental members of the shoe have one end of an upstanding spring arm 11 in engagement therewith, the upper end portion of said strap being bent over in a horizontal plane and projected forwardly as indicated at 12, and extended alongside and beyond the standard 3. The horizontal portion 12, of said strap has bolt openings formed through it in front of and behind said standard, through which bolts 13—14, respectively pass and serve to hold each horizontal portion of the upstanding straps in binding engagement with the said standard, as shown in Fig. 2. Preferably the means for regulating and holding the said horizontal portions of the strap in position are the nuts 15—16, but it will of course be understood that the same fastening may be had by having the openings for the bolts provided with screw threads, and thread the bolts in a similar manner.

From the foregoing description it will be understood that through the described arrangement of the bottoms and the side wings of the members of the shoe the same will readily enter the furrow being formed, and owing to the tapering shape of the said shoe, the furrow will be smoothed and properly receive the corn. And it will be further understood that should any obstructions be encountered the shoe will through its described yielding front engagement and rear pivotal engagement with the opener, automatically rise relatively to said opener so as to present its flat bottom to the obstruction and thereby freely slide over the same. It will also be understood that the connecting strap 8 may be readily manipulated through its bolt 9 to increase or decrease the frictional engagement between the forward end of the members of the shoe.

Claims:

1. In a corn planter, the combination with a furrow opener and its standard, of a shoe having a yielding engagement with the furrow opener and a spring engagement with the standard.

2. In a planter, the combination with a furrow opener and its standard of a shoe comprising two complemental members held in yielding engagement with the furrow opener and with said standard.

3. In a planter, the combination with a furrow opener and its standard and a shoe comprising two complemental smoothing members located on opposite sides of the opener and having a frictional engagement therewith and a spring engagement with the said standard.

4. In a planter, the combination of a furrow opener and a standard therefor, a shoe comprising two complemental members having a flat bottom and upstanding side wings, said members being located on opposite sides of the opener and having a yielding engagement with the same and a spring engagement with the standard.

5. In a planter, a furrow opener carrying a standard, a shoe comprising two complemental smoothing members provided with flat bottoms and upstanding sides, the said members tapering rearwardly, a strap connecting the forward ends of said members and adapted to hold the same in frictional engagement with the opener, and an upstanding strap having a connection with the rear end of each of said members and a detachable but rigid engagement with the standard.

In testimony whereof I have hereunto set my hand in presence of two subscribing witnesses.

ADOLPH J. ANDERSON.

Witnesses:
C. M. CHRISTIANSON,
A. P. ORNOOT.